United States Patent
Taya et al.

(10) Patent No.: US 8,541,087 B2
(45) Date of Patent: Sep. 24, 2013

(54) PRESSURE-SENSITIVE ADHESIVE, SHEET FOR MANUFACTURING AN OPTICAL RECORDING MEDIUM AND OPTICAL RECORDING MEDIUM

(75) Inventors: Naoki Taya, Tokyo (JP); Masaharu Ito, Tokyo (JP); Takashi Morioka, Tokyo (JP)

(73) Assignee: Lintec Corporation, Tokyo (JP)

( * ) Notice: Subject to any disclaimer, the term of this patent is extended or adjusted under 35 U.S.C. 154(b) by 405 days.

(21) Appl. No.: 13/058,405

(22) PCT Filed: Jun. 25, 2009

(86) PCT No.: PCT/JP2009/061630
§ 371 (c)(1),
(2), (4) Date: Mar. 1, 2011

(87) PCT Pub. No.: WO2010/021201
PCT Pub. Date: Feb. 25, 2010

(65) Prior Publication Data
US 2011/0143076 A1    Jun. 16, 2011

(30) Foreign Application Priority Data
Aug. 18, 2008    (JP) ................................ 2008-209481

(51) Int. Cl.
*G11B 7/24* (2013.01)
(52) U.S. Cl.
USPC ...... 428/64.1; 428/64.4; 428/343; 428/355 R; 428/355 AC; 428/355 CN; 430/270.11

(58) Field of Classification Search
USPC .................... 428/64.4, 343, 355 R
See application file for complete search history.

(56) References Cited

U.S. PATENT DOCUMENTS

| 2005/0211588 A1 | 9/2005 | Kanner et al. |
| 2007/0196646 A1 | 8/2007 | Matano et al. |

FOREIGN PATENT DOCUMENTS

| JP | 2005-281360 A | 10/2005 |
| JP | 2005-325250 A | 11/2005 |
| JP | 2006-335997 A | 12/2006 |
| JP | 2007-044505 A | 2/2007 |
| JP | 2007-197629 A | 8/2007 |
| JP | 2007-246879 A | 9/2007 |

OTHER PUBLICATIONS

International Search Report mailed on Sep. 15, 2009 for the corresponding International patent application No. PCT/JP2009/061630.

*Primary Examiner* — Elizabeth Mulvaney
(74) *Attorney, Agent, or Firm* — Posz Law Group, PLC (57) ABSTRACT

A sheet (1) for manufacturing an optical disc which includes a pressure-sensitive adhesive layer (11), having a peak temperature of a loss tangent not higher than −10° C. and a polar component ($\gamma^P s$) of the surface energy not smaller than 2.0 mJ/m$^2$, and a protective sheet (12), is laminated on a data recording layer (3) (a laminate formed of a reflecting layer (31), a dielectric layer (32), a phase change layer (33) and a dielectric layer (32')) that is formed on an optical disc substrate (2). The sheet for manufacturing an optical disk (1) allows obtaining an optical recording medium that is provided with the pressure-sensitive adhesive layer (11) that has high adhesion to the data recording layer (3) and does not peel readily off adjacent layers.

11 Claims, 1 Drawing Sheet

PRESSURE-SENSITIVE ADHESIVE, SHEET FOR MANUFACTURING AN OPTICAL RECORDING MEDIUM AND OPTICAL RECORDING MEDIUM

CROSS REFERENCE TO RELATED APPLICATIONS

This application is a U.S. national stage application of PCT/JP2009/061630 filed on Jun. 25, 2009, and claims priority to, and incorporates by reference, Japanese Patent Application No. 2008-209481 filed on Aug. 18, 2008.

TECHNICAL FIELD

The present invention relates to an optical recording medium such as an optical disk, and to a pressure-sensitive adhesive and a sheet for manufacturing an optical recording medium that are used in the manufacture of the optical recording medium.

BACKGROUND ART

Optical disks widely used in recent years include, for instance, data read-only disks such as CD and CD-ROM, so-called rewritable optical disks such as CD-R, as well as magneto-optical disks called MO or MD. The recording capacity of these disks is about 650 MB (megabytes). Disks having greater capacities such as a family of optical disks called DVD (digital versatile disk) have also been developed. Specific examples of DVD include DVD-ROM (read only DVD), DVD-R (write-once DVD), DVD-RAM (write/read DVD) and DVD-RW (rewritable DVD). DVD types in practical use include types comprising two substrates bonded to each other, and have a recording capacity of 4.7 GB (gigabytes), on one side, and 9.4 GB on both sides. Red laser light of a wavelength ranging from about 630 to 650 nm is used for data recording and reproduction.

In case, for instance of high-definition video, current DVD types are however problematic in that recording is limited to only about 30 minutes on one side. It would be desirable for one side to be capable of recording at least two hours of high-definition video, to which end large-capacity optical disks are required. In order to implement such optical disks, recording/reproduction must be carried out using laser light of a shorter wavelength.

Accordingly, Blu-ray disk (BD) relying on blue laser light having a wavelength of about 405 nm is currently being implemented. Using blue laser light of such a short wavelength allows reducing both track pitch and pit size. However, the shorter wavelength is problematic in that it entails a shallower focus depth, which precludes the use of specifications and methods currently employed in the DVD family, namely bonding of substrates having each a thickness of 0.6 mm (to a total substrate thickness of 1.2 mm).

Therefore, for instance, a data recording layer provided on a 1.1 mm-thick substrate has bonded thereon a 0.1 mm-thick light-transmitting protective film of the same material as the substrate. Examples of methods for bonding the protective film in this case include, for instance, using an energy-beam curable adhesive or pressure-sensitive adhesive sheet. Such energy-beam curable adhesives and adhesive sheets must not impair the recording/reproduction function of the optical disk.

In a method of bonding a protective film using an energy-beam curable adhesive, the adhesive is ordinarily coated by spin coating, which is problematic in that thickness unevenness is likely to occur. By contrast, bonding using a pressure-sensitive adhesive sheet allows realizing high thickness precision.

Such optical disks are exposed to harsh environments in actual use. When used on board vehicles, for instance, the temperature can be anticipated to rise to about 80° C. in midsummer, and to drop to about −20° C. in cold regions. During rainy seasons, moreover, the optical disk may be exposed not only to high temperature, but also to high humidity. Depending on the type of the pressure-sensitive adhesive, the metal layer/metal oxide layer of the data recording layer may corrode when the optical disk is used under such conditions. Also, changes in temperature may result in delamination between recording layers, between a recording layer and the pressure-sensitive adhesive, or between the protective film and the pressure-sensitive adhesive, as a result of which the functionality of the optical disk may be lost.

A possible method of enhancing adhesion to metal layers/metal oxide layers involves ordinarily incorporating acidic groups into the main component of the pressure-sensitive adhesive. However, this gives rise to corrosion of the metal layer/metal oxide layer, in particular at high temperature and high humidity. Corrosion is suppressed if acidic groups are absent, but, conversely, adherence drops dramatically.

In order to solve the above problems, Patent document 1 proposes a pressure-sensitive adhesive based on a (meth) acrylate copolymer that contains a (meth)acrylate and a nitrogen atom-containing copolymerizable monomer but that contains no carboxyl group-containing copolymerizable monomer.

Patent document 1: Japanese Patent Application Laid-open No. 2005-325250

However, Patent document 1 does not address the behavior of the properties of the aforementioned (meth)acrylate copolymer with respect to temperature. Actually, the features disclosed in the examples result in delamination during heat cycle testing according to the envisaged use environment. This can arguably be ascribed to insufficient adhesion of the pressure-sensitive adhesive to the metal layer/metal oxide layer, and to stretching and shrinkage of the pressure-sensitive adhesive layer. That is, the adherence and delamination prevention required in practice fail to be achieved by merely using a monomer component in the form of a (meth)acrylate copolymer having a nitrogen atom-containing copolymerizable monomer.

DISCLOSURE OF THE INVENTION

In the light of the above problems, it is an object of the present invention to provide a pressure-sensitive adhesive that forms a pressure-sensitive adhesive layer having high adhesion to a data recording layer and that does not delaminate readily off adjacent layers, to provide a sheet for manufacturing an optical recording medium having such a pressure-sensitive adhesive layer, and to provide an optical recording medium provided with such a pressure-sensitive adhesive layer.

To attain the above goal, the present invention provides firstly a pressure-sensitive adhesive that forms a pressure-sensitive adhesive layer provided adjacent to a data recording layer of an optical recording medium, wherein a peak temperature of a loss tangent is not higher than −10° C., and a polar component $\gamma^P s$ of a surface energy of the pressure-sensitive adhesive layer is not smaller than 2.0 mJ/m² (Invention 1). In the present description, the term "pressure-sensitive adhesive" denotes conceptually also a pressure-sensitive adhesive composition.

Secondly, the present invention provides a sheet for manufacturing an optical recording medium having a data recording layer, comprising a pressure-sensitive adhesive layer provided adjacent to the data recording layer, wherein the pressure-sensitive adhesive layer has a peak temperature of a loss tangent not higher than −10° C., and has a polar component $\gamma^P s$ of the surface energy not smaller than 2.0 mJ/m$^2$ (Invention 2).

In the present description, a "data recording layer" is a layer comprising a metal layer and/or a metal oxide layer and that may comprise a single layer or a plurality of layers. The term "optical recording medium" denotes a medium that allows recording and reproducing data optically, mainly a reproduction-only, write-once or rewritable disc-like medium (for instance, CD, CD-ROM, CD-R, CD-RW, DVD, DVD-ROM, DVD-R, DVD-RW, DVD-RAM, BD, BD-ROM, BD-R, BD-RAM, LD, MO, MD or the like). So called optical disks (including magneto-optical disks) fall under this category, but the term is not necessarily limited thereto.

The above inventions (Inventions 1 and 2) afford high adhesion of a pressure-sensitive adhesive layer to metal layers/metal oxide layers, and reduce the likelihood of delamination between a pressure-sensitive adhesive layer and adjacent layers, even in a thermal cycling environment, or at high temperature and high humidity.

In the above invention (Invention 2), preferably, a pressure-sensitive adhesive that forms the pressure-sensitive adhesive layer has a (meth)acrylate copolymer as a main component (Invention 3). In the present description, the term "(meth) acrylate" refers to acrylates and/or methacrylates.

In the above invention (Invention 3), preferably, the (meth)acrylate copolymer has a nitrogen atom-containing copolymerizable monomer as a monomer component (Invention 4).

In the above inventions (Inventions 3 and 4), preferably, the (meth)acrylate copolymer has methyl(meth)acrylate as a monomer component (Invention 5).

In the above inventions (Inventions 3 to 5), preferably, the (meth)acrylate copolymer does not contain an acidic group (Invention 6).

In the above inventions (Inventions 2 to 6), preferably, a protective layer that forms an optical recording medium may be laminated on the pressure-sensitive adhesive layer (Invention 7).

In the above inventions (Inventions 2 to 7), preferably, the pressure-sensitive adhesive strength is not lower than 8.0 N/25 mm (Invention 8).

Thirdly, the present invention provides an optical recording medium (Invention 9) characterized by being manufactured using the aforementioned pressure-sensitive adhesive (Invention 1) or the aforementioned sheet for manufacturing an optical recording medium (Inventions 2 to 8).

Fourthly, the present invention provides an optical recording medium that comprises at least a data recording layer and a pressure-sensitive adhesive layer adjacent to the data recording layer, wherein the peak temperature of the loss tangent of the pressure-sensitive adhesive layer is not higher than −10° C., and the polar component $\gamma^P s$ of the surface energy of the pressure-sensitive adhesive layer is not smaller than 2.0 mJ/m$^2$ (Invention 10).

EFFECTS OF THE INVENTION

The present invention allows obtaining a pressure-sensitive adhesive layer having high adhesion to a data recording layer, and that does not delaminate readily off adjacent layers, even in a thermal cycling environment or at high temperature and high humidity. A highly reliable optical recording medium can be obtained as a result having unimpaired data recording/reproduction performance.

BRIEF DESCRIPTION OF THE DRAWINGS

FIGS. 2($a$)-2($d$) are a set of diagrams illustrating an example of a method for manufacturing an optical disk that uses the sheet for manufacturing an optical disk according to the embodiment.

EXPLANATION OF REFERENCE NUMERALS 1 sheet for manufacturing an optical disk
11 pressure-sensitive adhesive layer
12 protective sheet
2 optical disk substrate
3 data recording layer
31 reflective layer
32, 32' dielectric layer
33 phase change layer
34 reflective layer (semi-transparent layer)
D1 optical disk

BEST MODE FOR CARRYING OUT THE INVENTION

Embodiments of the present invention are explained as follows.

Figure 1:
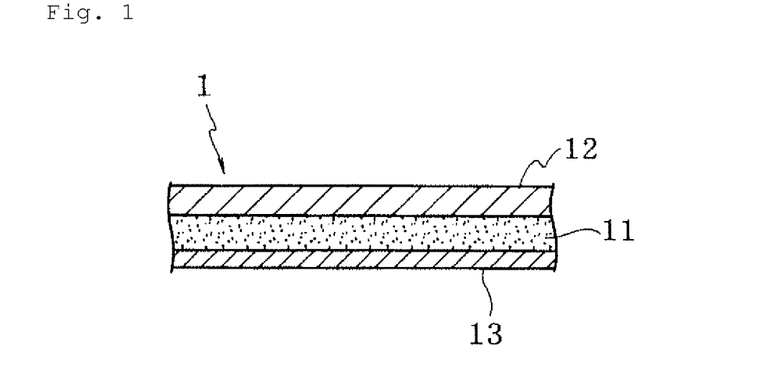
FIG. 1 is a cross-sectional diagram of a sheet for manufacturing an optical disk according to an embodiment of the present invention.
Figure 2:
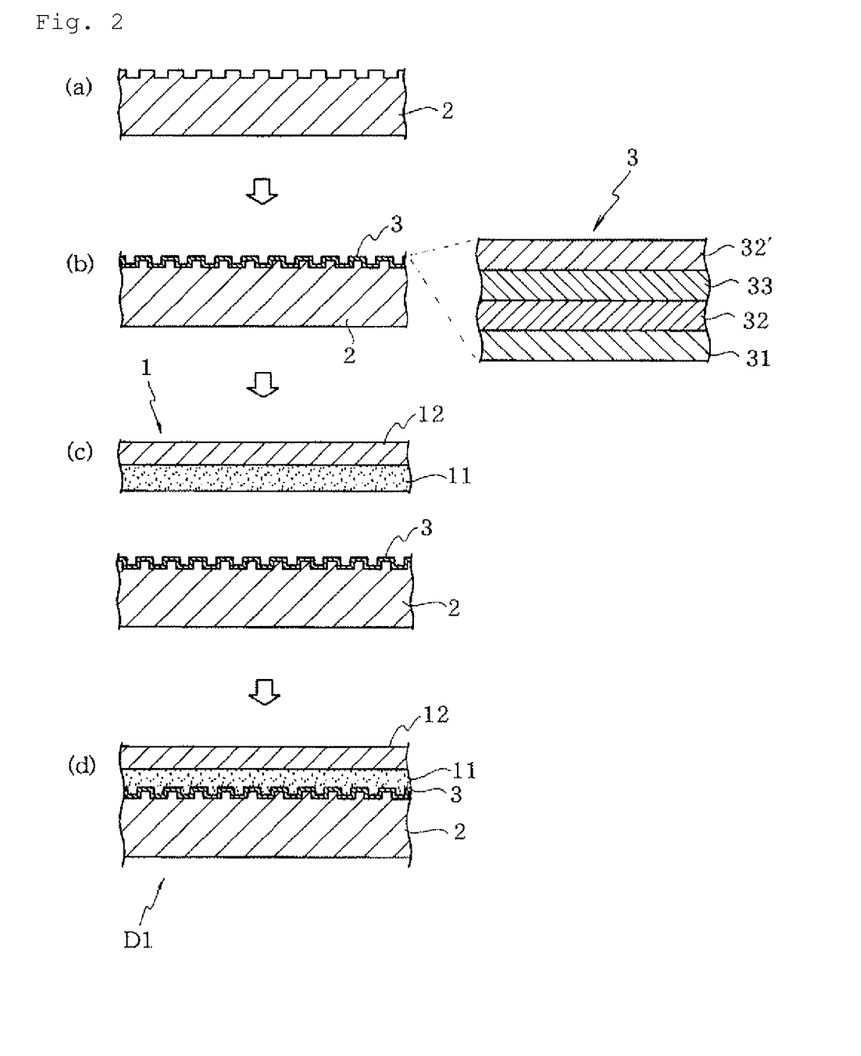

In the present embodiment there is explained a sheet for manufacturing an optical disk, wherein the purpose of the sheet is to form a protective layer in an optical disk, as an optical recording medium. FIG. 1 is a cross-sectional diagram of a sheet for manufacturing an optical disk according to an embodiment of the present invention. FIGS. 2($a$) to 2($d$) are diagrams illustrating an example of a method for manufacturing an optical disk that uses the sheet for manufacturing an optical disk according to the embodiment.

As illustrated in FIG. 1, a sheet for manufacturing an optical disk 1 according to the present embodiment comprises a pressure-sensitive adhesive layer 11, a protective sheet (protective layer) 12 laminated on one face (top face in FIG. 1) of the pressure-sensitive adhesive layer 11, and a release sheet 13 laminated on the other face (bottom face in FIG. 1) of the pressure-sensitive adhesive layer 11. The protective sheet 12 constitutes a protective layer of the optical disk. The release sheet 13 is removed during use of the sheet for manufacturing an optical disk 1.

The purpose of the pressure-sensitive adhesive layer 11 in the present embodiment is to bond the protective sheet 12 to a data recording layer 3 that is formed on an optical disk substrate 2 (FIG. 2). The peak temperature of the loss tangent of the pressure-sensitive adhesive layer 11 must be not higher than −10° C., and the polar component $\gamma^P s$ of the surface energy must be not smaller than 2.0 mJ/m$^2$. When the above conditions are satisfied, delamination becomes less likely between the pressure-sensitive adhesive layer 11 and the data recording layer 3, and between the pressure-sensitive adhesive layer 11 and the protective sheet 12, even in a thermal cycling environment or at high temperature and high humidity. Also, there increases the adhesion of the pressure-sensitive adhesive layer 11 towards metals/metal oxides, as well as adherence between the data recording layer 3, which comprises a metal layer and/or a metal oxide layer, and the pressure-sensitive adhesive layer 11. Herein, a thermal cycling environment refers to an environment where exposure to low temperature (for instance, −20° C.) for a given lapse of time and subsequent exposure to high temperature (for instance, 80° C.) for a given lapse of time are performed repeatedly.

A method for measuring peak temperature of loss tangent is explained in below-described examples. The polar component $\gamma^P s$ of the surface energy is measured in accordance with the method by Owens and Wendlt. The specific measurement method is explained in the below-described examples.

When the peak temperature of the loss tangent of the pressure-sensitive adhesive layer 11 is higher than −10° C., there occurs delamination between the pressure-sensitive adhesive layer 11 and the data recording layer 3, or between the pressure-sensitive adhesive layer 11 and the protective sheet 12, in a thermal cycling environment, for instance between −20° C. and 80° C. This affects adversely the performance of an optical disk D1.

Preferably, the peak temperature of the loss tangent of the pressure-sensitive adhesive layer 11 is not higher than −15° C. The peak temperature of the loss tangent may be arbitrarily low, although a practicable lower limit thereof is about −40° C.

If the polar component $\gamma^P s$ of the surface energy of the pressure-sensitive adhesive layer 11 is smaller than 2.0 mJ/m$^2$, adhesion to the data recording layer 3 becomes insufficient, and delamination occurs between the pressure-sensitive adhesive layer 11 and the data recording layer 3 when the obtained optical disk D1 is used.

The polar component $\gamma^P s$ of the surface energy of the pressure-sensitive adhesive layer 11 is preferably not smaller than 3.0 mJ/m$^2$, the upper limit thereof being ordinarily of about 35 mJ/m$^2$.

The storage modulus of the pressure-sensitive adhesive layer 11 at 25° C. ranges preferably from $1 \times 10^{-3}$ to 1 MPa, in particular from $1 \times 10^{-2}$ to 0.5 MPa. When the storage modulus lies within the above range, the pressure-sensitive adhesive layer 11 that is press-bonded to the data recording layer 3 fits well the convexoconcave of the data recording layer 3. As a result, this increases the reliability of data recording or reproduction, and prevents the pressure-sensitive adhesive from seeping out of the side face of the optical disk.

The gel fraction (%) of the pressure-sensitive adhesive layer 11 is preferably not lower than 65%, and ranges preferably, in particular, from 70 to 85%. Seeping of part of the pressure-sensitive adhesive layer beyond the side face of the optical disk is suppressed when the gel fraction of the pressure-sensitive adhesive layer 11 is not lower than 65%. This allows suppressing contamination of the optical disk and/or the recording-reproducing device.

The pressure-sensitive adhesive that forms the pressure-sensitive adhesive layer 11 has preferably a (meth)acrylate copolymer as a main component. Herein, a (meth)acrylate copolymer denotes a polymer comprising a (meth)acrylate monomer as a constituent component. Such (meth)acrylate copolymers are excellent for optical applications, and can satisfy the above-described peak temperature of the loss tangent and polar component values of the surface energy of the pressure-sensitive adhesive layer 11 through appropriate selection and/or adjustment of monomer types and monomer blending ratios.

The above-described alkyl(meth)acrylate monomer is an alkyl(meth)acrylate having from 1 to 20 carbon atoms in the alkyl moiety thereof, preferably an alkyl(meth)acrylate having from 1 to 12 carbon atoms in the alkyl moiety thereof. Specific examples thereof include, for instance, methyl (meth)acrylate, ethyl(meth)acrylate, propyl(meth)acrylate, n-butyl(meth)acrylate, isobutyl(meth)acrylate, t-butyl(meth)acrylate, pentyl(meth)acrylate, hexyl(meth)acrylate, cyclohexyl(meth)acrylate, 2-ethylhexyl(meth)acrylate, isooctyl (meth)acrylate, decyl(meth)acrylate, dodecyl(meth)acrylate, myristyl(meth)acrylate, palmityl(meth)acrylate, stearyl (meth)acrylate or the like. The foregoing can be used singly or in combinations of two or more types.

The ratio of alkyl(meth)acrylate monomer with respect to all the monomers that form the (meth)acrylate copolymer ranges preferably from 65 to 99.9 wt %, in particular from 67 to 99 wt %. When the ratio of alkyl(meth)acrylate lies within the above range, the pressure-sensitive adhesive layer 11 that is press-bonded to the data recording layer 3 fits well the convexoconcave of the data recording layer 3. As a result, this increases the reliability of data recording or reproduction, and allows securing the content of the below-described nitrogen atom-containing copolymerizable monomer and methyl (meth)acrylate.

In particular, the (meth)acrylate copolymer has preferably methyl(meth)acrylate, and more preferably methyl acrylate, as a monomer component. Using methyl(meth)acrylate as the monomer component allows increasing the adhesion of the obtained (meth)acrylate copolymer to metals/metal oxides.

Methyl acrylate or methyl methacrylate can be used singly as the methyl(meth)acrylate, but combinations of methyl acrylate and methyl methacrylate can also be used.

The ratio of methyl(meth)acrylate with respect to all the monomers that form the (meth)acrylate copolymer ranges preferably from 18 to 40 wt %, in particular from 20 to 35 wt %. Good adherence of the pressure-sensitive adhesive layer 11 to the data recording layer 3 is achieved when the methyl (meth)acrylate ratio lies within the above range, and also there can be prevented more effectively delamination between the pressure-sensitive adhesive layer 11 and the data recording layer 3 in a thermal cycling environment.

Preferably, the (meth)acrylate copolymer comprises a nitrogen atom-containing copolymerizable monomer as a constituent component. The nitrogen atom-containing copolymerizable monomer is a polar component and allows increasing the adhesion of the obtained (meth)acrylate copolymer to metals/metal oxides.

Examples of the nitrogen atom-containing copolymerizable monomer include, for instance, acrylamide, methacrylamide, N-methylacrylamide, N-methyl methacrylamide, N-methylol acrylamide, N-methylol methacrylamide, N-tert-butylacrylamide, N-vinyl pyrrolidone, N,N-dimethylacrylamide, N,N-ethylacrylamide, N,N-dimethylaminopropylacrylamide, N-isopropylacrylamide, N-phenylacrylamide, dimethylaminopropylacrylamide, N-vinyl caprolactam, acryloyl morpholine, monomethylaminoethyl(meth)acrylate, monoethylaminoethyl(meth)acrylate, monomethylaminopropyl(meth)acrylate, monoethylaminopropyl(meth)acrylate, dimethylaminoethyl(meth)acrylate, acryloyl piperidine or the like. The foregoing can be used singly or in combinations of two or more types.

The ratio of nitrogen atom-containing copolymerizable monomer with respect to all the monomers that form the (meth)acrylate copolymer ranges preferably from 0.1 to 15 wt %, in particular from 0.3 to 10 wt %. Adherence of the pressure-sensitive adhesive layer 11 to the data recording layer 3 is yet better when the ratio of the nitrogen atom-containing copolymerizable monomer lies within the above range.

Preferably, the (meth)acrylate copolymer comprises both the above-described methyl(meth)acrylate and nitrogen atom-containing copolymerizable monomer as monomer components.

Preferably, the (meth)acrylate copolymer contains no acidic groups. The presence of an acidic group enhances the adhesion of the pressure-sensitive adhesive layer 11 to the data recording layer 3, but makes corrosion of the data recording layer 3 likelier. The above-described preferred (meth)acrylate copolymers elicit sufficient adhesion to the data recording layer 3 even though they contain no acidic groups.

Preferably, the (meth)acrylate copolymer has a crosslinkable functional group in the molecule. Crosslinkable functional groups include, for instance, carboxyl groups, hydroxyl groups, glycidyl groups and carbon-carbon unsaturated bonds. Preferred herein are hydroxyl groups, glycidyl groups and carbon-carbon unsaturated bonds, since these do not elicit corrosion of the data recording layer 3. Hydroxyl groups and glycidyl groups are crosslinked through reaction with a crosslinking agent, and carbon-carbon unsaturated bonds are crosslinked by virtue of addition reactions with each another. Methods for eliciting addition reactions in carbon-carbon unsaturated bonds include, for instance, irradiation with actinic radiation in the form of electron beams, UV rays or the like. Carboxyl groups are crosslinkable functional groups, but also acidic groups that cause corrosion of the data recording layer 3. Preferably, therefore, monomers having carboxyl groups are excluded.

To introduce hydroxyl groups or glycidyl groups into the (meth)acrylate copolymer, the (meth)acrylate may be polymerized with a monomer having a hydroxyl group or glycidyl group in the molecule and being copolymerizable with (meth)acrylate. Examples of monomers having hydroxyl groups in the molecule include, for instance, hydroxyalkyl(meth)acrylates such as 2-hydroxyethyl(meth)acrylate, 2-hydroxypropyl(meth)acrylate, 3-hydroxypropyl(meth)acrylate, 2-hydroxybutyl(meth)acrylate, 3-hydroxybutyl(meth)acrylate and 4-hydroxybutyl(meth)acrylate. Examples of monomers having glycidyl groups in the molecule include, for instance, glycidyl(meth)acrylate. The foregoing monomers can be each used singly or in combinations of two or more types.

Methods for introducing functional groups having carbon-carbon unsaturated bonds into a (meth)acrylate copolymer include, for instance, reacting a (meth)acrylate copolymer with compounds having, in the molecule, carbon-carbon unsaturated bonds and having functional groups that react with the functional groups of the (meth)acrylate copolymer (hereafter, "unsaturated bond-containing compounds"). The functional groups of the unsaturated bond-containing compound and the functional groups of the (meth)acrylate copolymer can be arbitrarily selected. For instance, hydroxyl groups, isocyanate groups, carboxyl groups and glycidyl groups may be used. In a specific example, a functional group of the (meth)acrylate copolymer is a hydroxyl group and a functional group of the unsaturated bond-containing compound is an isocyanate group. Examples of the unsaturated bond-containing compound include, for instance, compounds having an isocyanate group, such as methacryloyloxyethyl isocyanate, allyl isocyanate or the like; compounds having a carboxyl group, such as (meth)acrylic acid; and compounds having a glycidyl group, such as glycidyl(meth)acrylate. The foregoing can be used singly or in combinations of two or more types.

The ratio of monomer having a crosslinkable functional group in the molecule with respect to all the monomers that form the (meth)acrylate copolymer ranges preferably from 0.1 to 5 wt %, in particular, from 0.5 to 3 wt %. Keeping within the above range the ratio of the monomer having a crosslinkable functional group in the molecule allows the (meth)acrylate copolymer to be crosslinked suitably, and allows the gel fraction of the pressure-sensitive adhesive layer to take on the aforementioned preferred values. In a case where the crosslinkable functional group is a carbon-carbon unsaturated bond, the monomer having a crosslinkable functional group denotes a monomer having a carbon-carbon unsaturated bond introduced therein through reaction with an unsaturated bond-containing compound.

As desired, the (meth)acrylate copolymer may comprise, as constituent components, monomers other than the above-described monomers. Examples of such other monomers include, for instance, alkoxyalkyl(meth)acrylates such as methoxyethyl(meth)acrylate or ethoxyethyl(meth)acrylate; as well as vinyl acetate or styrene.

The above-described (meth)acrylate copolymer can be produced in accordance with known polymerization methods, for instance solution polymerization, bulk polymerization or the like using a mixture of the above-described monomers as a starting material. An azo initiator or a peroxide initiator can be used as the polymerization initiator employed for polymerization. Examples of azo initiators include, for instance, 2,2'-azobisisobutyronitrile, 2,2'-azobis-2-methyl butyronitrile, dimethyl 2,2'-azobis(2-methyl propionate), 4,4'-azobis(4-cyanovalelic acid), azobisisovaleronitrile, 2,2'-azobis(2-amidinopropane)dihydrochloride, 2,2'-azobis[2-(5-methyl-2-imidazolin-2-yl)propane]dihydrochloride, 2,2'-azobis(2-methyl propionamidine)disulfate, 2,2'-azobis(N,N'-dimethylene isobutyl amidine)dihydrochloride or the like. Peroxide initiators include, for instance as dibenzoyl peroxide, t-butyl permaleate or the like.

The amount of polymerization initiator used is not particularly limited, but ranges ordinarily from 0.01 to 2 parts by mass with respect to 100 parts by mass of monomer component.

The weight-average molecular weight of the (meth)acrylate copolymer ranges preferably from about 200,000 to 1,800,000, more preferably from 500,000 to 1,500,000.

Preferably, the above-described (meth)acrylate copolymer is crosslinked by way of a crosslinking agent. Cross-linking of the (meth)acrylate copolymer allows enhancing the strength and storage stability of the pressure-sensitive adhesive layer 11. Also, the gel fraction of the pressure-sensitive adhesive can be controlled by adjusting the degree of crosslinking of the (meth)acrylate copolymer.

Examples of the crosslinking agent include, for instance, polyisocyanate compounds, metal chelate compounds, epoxy compounds and the like, preferably polyisocyanate compounds.

Examples of polyisocyanate compounds that can be used are compounds having two or more isocyanate groups in the molecule, for instance, tolylene diisocyanate or a hydride thereof; an adduct of tolylene diisocyanate and trimethylolpropane; triphenylmethane triisocyanate; methylene bis-diphenylisocyanate or a hydride thereof; hexamethylene diisocyanate; an adduct of hexamethylene diisocyanate and trimethylolpropane; xylylene diisocyanate; an adduct of xylene diisocyanate and trimethylolpropane; 4,4'-dicyclohexylmethane diisocyanate, or polymers of the foregoing, The amount of crosslinking agent used is not particularly limited, but ranges ordinarily from 0.01 to 10 parts by mass with respect to 100 parts by mass of the (meth)acrylate copolymer.

In addition to the above-described (meth)acrylate copolymer and crosslinking agent, the pressure-sensitive adhesive that forms the pressure-sensitive adhesive layer 11 may also contain, for instance, an antioxidant, a tackifying resin (petroleum resin, terpene resin, rosin resin, coumarone-indene resin, phenol resin or the like), a UV absorbent, a light stabilizer, a softener, a rust inhibitor, a silane coupling agent, a filler and the like.

The antioxidant that is used can be appropriately selected from among, for instance, known hindered phenolic antioxidants, amine antioxidants, sulfur antioxidants, phosphorus antioxidants and quinone antioxidants, but a hindered phenolic antioxidant is preferably used. Corrosion of the data recording layer 3 can be effectively suppressed through the addition of such an antioxidant.

Specific examples of the antioxidant include, for instance, monocyclic phenolic antioxidants such as 2,6-di-tert-butyl-p-cresol, butylhydroxyanisole, stearyl β-(3,5-di-tert-butyl-4-hydroxyphenyl)propionate or the like; dicyclic phenolic antioxidants such as 4,4'-butylidene bis(3-methyl-6-tert-butylphenol), 3,6-dioxaoctamethylene bis[3-(3-tert-butyl-4-hydroxy-5-methyl phenylpropionate] and the like; tricyclic phenolic antioxidants such as 1,1,3-tris(2-methyl-4-hydroxy-5-tert-butylphenyl)butane and the like; as well as tetracyclic phenolic antioxidants such as tetrakis[methylene-3-(3',5'-di-tert-butyl-4'-hydroxyphenyl)propionate]methane and the like. The foregoing antioxidants may be used singly or in combination of two or more types.

The amount of antioxidant used is not particularly limited, but ranges ordinarily from 0.005 to 10 wt %, preferably from 0.01 to 5 wt %, with respect to the pressure-sensitive adhesive that forms the pressure-sensitive adhesive layer 11.

The total content of residual solvent and residual monomer in the pressure-sensitive adhesive that forms the pressure-sensitive adhesive layer 11 is preferably no greater than 100 wt ppm, more preferably no greater than 50 wt ppm, and in particular no greater than 20 wt ppm. Corrosion of the data recording layer 3 can be suppressed yet more effectively when the residual amounts of solvent and monomers are thus small.

The thickness of the pressure-sensitive adhesive layer 11 is appropriately decided in accordance with, for instance, the depth of the convexoconcave pattern (lands and grooves) formed on the optical disk substrate 2, but ranges ordinarily from about 5 to 60 μm, preferably from 10 to 30 μm.

The protective sheet 12, whose purpose is to protect the data recording layer 3 of the optical disk D1, constitutes a light-receiving surface of the optical disk D1.

The material of the protective sheet 12 must have sufficient light transmissiveness in the wavelength band of the laser light used in the optical disk D1. Films that transmit visible light in the wavelength band from 380 to 780 nm are ordinarily used.

As such a light-transmitting film there can be used, for instance, a film comprising transparent resin such as an acrylic-based resin, a polyolefin-based resin, a polycarbonate-based resin, a norbornene-based resin or the like. Preferably, the coefficient of linear expansion of the protective sheet 12 is substantially identical to the coefficient of linear expansion of the optical disk substrate 2, so as to prevent the optical disk from warping at high temperature. In a case where the optical disk substrate 2 comprises a polycarbonate resin, therefore, the protective sheet 12 comprises preferably a polycarbonate resin likewise.

A hardcoat layer may be provided on the surface of the light-transmitting film on the side opposite to the pressure-sensitive adhesive layer 11. Damage of the surface of the protective sheet 12, for instance due to contact with the optical head of a drive, becomes less likely by providing such a hardcoat layer.

Preferably, the protective sheet 12 has as flat surface as possible and exhibits very few birefringency. Birefringence in the protective sheet 12 impairs the degree of focusing of a focused laser beam. Uneven thickness impairs the degree of focusing of the laser beam, and hence thickness unevenness should preferably be as small as possible.

The thickness of the protective sheet 12 is decided in accordance with the type of the optical disk D1 and the thickness of the optical disk substrate 2, but ranges ordinarily from about 50 to 100 μm, preferably from about 50 to 90 μm.

A known conventional release sheet can be used as the release sheet 13. For instance, there can be used a resin film comprising polyethylene terephthalate, polypropylene or the like, or a release sheet resulting from subjecting such a resin film to a release treatment using a silicone-based release agent, a long-chain alkyl-based release agent, an alkyd resin-based release agent or the like.

In order to impart smoothness to the pressure-sensitive adhesive layer 11, the surface roughness (Ra) of the release sheet 13 on the release-treated side (side that comes into contact with the pressure-sensitive adhesive layer 11) is preferably no greater than 0.1 μm. The thickness of the release sheet 13 ranges ordinarily from about 10 to 200 μm, preferably from about 20 to 100 μm.

The pressure-sensitive adhesive strength of the sheet for manufacturing an optical recording medium is preferably not lower than 8.0 N/25 mm, in particular not lower than 10 N/25 mm. Sufficient adhesion between the pressure-sensitive adhesive layer 11 and the data recording layer 3 is achieved, and delamination between the foregoing becomes less likely, when the pressure-sensitive adhesive strength is not lower than 8.0 N/25 mm. A method for measuring pressure-sensitive adhesive strength is described in the examples below.

The sheet for manufacturing an optical disk 1 according to the present embodiment can be obtained by preparing a coating agent containing a material that forms the pressure-sensitive adhesive layer 11 and also, as desired, a solvent (for instance, ethyl acetate, toluene, 2-butanone or the like); applying the coating agent on the protective sheet 12, using coating equipment such as, for instance, a kiss roll coater, a reverse roll coater, a knife coater, a roll knife coater or a die coater or the like, followed by drying, to form a pressure-sensitive adhesive layer 11; and overlaying thereafter the release-treated face of the release sheet 13 onto the surface of the pressure-sensitive adhesive layer 11, to form a laminate of the pressure-sensitive adhesive layer 11 and the release sheet 13. Alternatively, the sheet for manufacturing an optical disk 1 can be obtained by applying the above-described coating agent onto the release-treated face of the release sheet 13, followed by drying, to form the pressure-sensitive adhesive layer 11; and laminating thereafter the protective sheet 12 on the surface of the pressure-sensitive adhesive layer 11. The pressure-sensitive adhesive layer 11 is dried through heating at 70° C. or above, preferably at 80 to 150° C. for about 10 seconds to 10 minutes.

The sheet for manufacturing an optical disk 1 thus obtained can preferably be used in an optical disk, in particular in an optical disk that uses light of a wavelength ranging from 400 to 432 nm for recording and reproduction. In this case, the sheet for manufacturing an optical disk 1, excluding the release sheet 13, (laminate of the protective sheet 12 and the pressure-sensitive adhesive layer 11) has preferably a light transmittance not lower than 85% at wavelengths from 400 to 432 nm. A light transmittance not lower than 85% results in good transmission to laser beams irradiated onto the data recording layer of the optical disk, as well as good transmission of light reflected from the data recording layer. More preferably, light transmittance is not lower than 90%.

An explanation follows next on a method for manufacturing the optical disk D1 (single-sided single-layer type) using the above-described sheet for manufacturing an optical disk 1.

An optical disk substrate 2 having a convexoconcave pattern that comprises grooves and lands, as illustrated in FIG. 2(a), is manufactured first. Ordinarily, the optical disk substrate 2 comprises polycarbonate, and can be molded in accordance with a molding method such as injection molding.

The data recording layer 3 is formed on the convexoconcave pattern of the optical disk substrate 2, as illustrated in FIG. 2(b). The data recording layer 3 is made up of a layer comprising a metal or an inorganic material that comprises a metal oxide, or is made up of a laminate of such layers. In particular, the data recording layer 3 is often made up of a laminate that comprises, from the bottom up, a reflective layer 31, a dielectric layer 32, a phase change layer 33 and a dielectric layer 32'. These layers can be formed by sputtering or the like.

As the material of the reflective layer 31 there can be used a metal such as Al, Ag, Au, Cu, Ta, W or the like or an alloy of the foregoing, for instance Al—Cr, Ag—Pt—Cu or Ag—Nd having Cr, Pt or Nd added thereto. The thickness of reflective layer 31 ranges ordinarily from about 3 to 200 nm.

As the material of the dielectric layer 32 and the dielectric layer 32' there can be used, for instance, a single metal oxide such as $SiO_2$, $ZnS$—$SiO_2$, $Si$—$SiO_2$, $TiO_2$, $ZnO$, $MgO$, or a combination of the foregoing. The thickness of the dielectric layer 32 and the dielectric layer 32' ranges ordinarily from about 20 to 200 nm.

As the material of the phase change layer 33 there can be used, for instance, a chalcogenide-based alloy thin layer, for instance, Ge—Te, Ge—Te—Sb, Ge—Sn—Te or the like, or a Sb—Te eutectic-system-based thin layer. The thickness of the phase change layer 33 ranges ordinarily from about 5 to 20 nm.

The data recording layer 3 may be a reflective layer alone, or a laminate comprising a pigment layer. Examples of the pigment in the pigment layer include, for instance, polymethine-based pigments, anthraquinone-based pigments, cyanine-based pigments, phthalocyanine-based pigments or the like. The pigment layer is formed, for instance, by spin coating, to a thickness that ranges ordinarily from about 20 to 2000 nm.

Next, the release sheet 13 of the sheet for manufacturing an optical disk 1 is removed, thus exposing the pressure-sensitive adhesive layer 11, as illustrated in FIG. 2(c), and then the pressure-sensitive adhesive layer 11 is press-bonded to the surface of the data recording layer 3 on the optical disk substrate 2, as illustrated in FIG. 2(d).

The optical disk D1 thus obtained has high adherence between the pressure-sensitive adhesive layer 11 and the data recording layer 3, even in a thermal cycling environment or at high temperature and high humidity. Therefore, delamination does not occur readily between the pressure-sensitive adhesive layer 11 and the data recording layer 3, or between the pressure-sensitive adhesive layer 11 and the protective sheet 12. Corrosion of the data recording layer 3 can be suppressed if the (meth)acrylate copolymer that forms the pressure-sensitive adhesive layer 11 contains no acidic groups. Therefore, the above-described sheet for manufacturing an optical disk 1 allows obtaining a highly reliable optical disk D1 having unimpaired data recording/reproduction performance. Blue laser light can be used in the optical disk D1 and hence the latter is particularly suited as a large-capacity Blu-ray disk family, for instance BD-ROM, BD-R and BD-RAM.

The above-described optical disk manufacturing method is merely an example. The optical disk manufacturing method using the sheet for manufacturing an optical disk according to the present embodiment is not limited to the above-described manufacturing method.

Other Embodiments

In the above embodiment, the pressure-sensitive adhesive that forms the pressure-sensitive adhesive layer 11 is formed beforehand to a layer shape and is used in the form of the sheet for manufacturing an optical disk 1, but the present invention is not limited thereto. For instance, the pressure-sensitive adhesive (pressure-sensitive adhesive of the present invention) that forms the pressure-sensitive adhesive layer 11 may be used directly in the manufacture of the optical disk (for bonding of the protective sheet 12), for instance by being spin-coated in a liquid state.

In the above embodiment, an example has been explained of a sheet for manufacturing an optical disk such that the purpose of the sheet is to form a protective layer of an optical disk. However, there may also be manufactured a sheet for manufacturing an optical disk having the pressure-sensitive adhesive layer 11 but not the protective sheet 12, so that the pressure-sensitive adhesive layer 11 of the sheet for manufacturing an optical disk is used for bonding together two substrates provided each with an data recording layer.

The above embodiments have been described so as to facilitate comprehension the present invention, but the embodiments do not to limit the present invention in any way. Therefore, the features disclosed in the above embodiments are meant to encompass all design variations and equivalents within the technical scope of the present invention.

For instance, the release sheet 13 of the sheet for manufacturing an optical disk 1 may be omitted.

EXAMPLES

The present invention is explained in further detail below based on examples, but the scope of the present invention is not limited to the examples.

Example 1

Herein, 68.5 parts by mass of n-butyl acrylate, 30 parts by mass of methyl acrylate, 1 part by mass of 2-hydroxyethyl acrylate and 0.5 parts by mass of acrylamide (nitrogen atom-containing copolymerizable monomer), as monomer components, and 0.2 parts by mass of 2,2'azobisisobutyronitrile, as a polymerization initiator, were added to 200 parts by mass of ethyl acetate, with stirring for 17 hours at 60° C., to yield a solution of an acrylate copolymer having a weight-average molecular weight of 600,000.

Then, 1.2 parts by mass, on solids basis, of an adduct of xylene diisocyanate and trimethylolpropane (TD-75 by Soken Chemical & Engineering Co., Ltd.), as a crosslinking agent, were added to 100 parts by mass, on solids basis, of the obtained acrylate copolymer solution, and the whole was diluted in 2-butanone to a concentration of 25 wt %, to yield a pressure-sensitive adhesive solution (coating agent).

The pressure-sensitive adhesive solution was coated, using a knife coater, onto the release-treated face of a release sheet (SP-PET 381031 by Lintec Corp., obtained by treating a polyethylene terephthalate film with a release treatment using a silicone resin release agent), followed by drying at 90° C. for 1 minute, to form a 25 μm-thick pressure-sensitive adhesive layer. Next, a polycarbonate film (Pure-Ace C110-75, thickness: 75 μm, by TEIJIN Ltd.), as a protective sheet, was laminated onto the pressure-sensitive adhesive layer, to yield a sheet for manufacturing an optical disk having a thickness of 100 μm (excluding the release sheet).

Example 2

A sheet for manufacturing an optical disk was produced in the same way as in Example 1, but herein the addition amount of the xylene diisocyanate adduct in Example 1 was changed to 0.6 parts by mass.

Example 3

A sheet for manufacturing an optical disk was produced in the same way as in Example 1, but herein the addition amount of the adduct of xylene diisocyanate and trimethylolpropane in Example 1 was changed to 0.3 parts by mass.

Example 4

Herein, 78.5 parts by mass of n-butyl acrylate, 20 parts by mass of methyl acrylate, 1 part by mass of 2-hydroxyethyl acrylate and 0.5 parts by mass of acrylamide, as monomer components, and 0.2 parts by mass of azobisisobutyronitrile, as a polymerization initiator, were added to 200 parts by mass of ethyl acetate, with stirring for 17 hours at 60° C., to yield a solution of an acrylate copolymer having a weight-average molecular weight of 650,000.
A sheet for manufacturing an optical disk was produced in the same way as in Example 1, but using herein the above acrylate copolymer solution.

Example 5

Herein, 84 parts by mass of n-butyl acrylate, 10 parts by mass of methyl acrylate, 1 part by mass of 2-hydroxyethyl acrylate and 5 parts by mass of acryloyl morpholine (nitrogen atom-containing copolymerizable monomer), as monomer components, and 0.2 parts by mass of azobisisobutyronitrile, as a polymerization initiator, were added to 200 parts by mass of ethyl acetate, with stirring for 17 hours at 60° C., to yield a solution of an acrylate copolymer having a weight-average molecular weight of 700,000.
A sheet for manufacturing an optical disk was produced in the same way as in Example 1, but using herein the above acrylate copolymer solution.

Comparative Example 1

Herein, 38.5 parts by mass of n-butyl acrylate, 60 parts by mass of methyl acrylate, 1 part by mass of 2-hydroxyethyl acrylate and 0.5 parts by mass of acrylamide, as monomer components, and 0.2 parts by mass of azobisisobutyronitrile, as a polymerization initiator, were added to 200 parts by mass of ethyl acetate, with stirring for 17 hours at 60° C., to yield a solution of an acrylate copolymer having a weight-average molecular weight of 600,000.
A sheet for manufacturing an optical disk was produced in the same way as in Example 1, but using herein the above acrylate copolymer solution.

Comparative Example 2

Herein, 59 parts by mass of n-butyl acrylate, 10 parts by mass of methyl acrylate, 1 part by mass of 2-hydroxyethyl acrylate and 30 parts by mass of acryloyl morpholine, as monomer components, and 0.2 parts by mass of azobisisobutyronitrile, as a polymerization initiator, were added to 200 parts by mass of ethyl acetate, with stirring for 17 hours at 60° C., to yield a solution of an acrylate copolymer having a weight-average molecular weight of 700,000.
A sheet for manufacturing an optical disk was produced in the same way as in Example 1, but using herein the above acrylate copolymer solution.

Comparative Example 3

Herein, 69 parts by mass of n-butyl acrylate, 10 parts by mass of methyl acrylate, 1 part by mass of 2-hydroxyethyl acrylate and 20 parts by mass of acryloyl morpholine, as monomer components, and 0.2 parts by mass of azobisisobutyronitrile, as a polymerization initiator, were added to 200 parts by mass of ethyl acetate, with stirring for 17 hours at 60° C., to yield a solution of an acrylate copolymer having a weight-average molecular weight of 700,000.
A sheet for manufacturing an optical disk was produced in the same way as in Example 1, but using herein the above acrylate copolymer solution.

Comparative Example 4

Herein, 77 parts by mass of n-butyl acrylate, 20 parts by mass of ethyl acrylate, and 3 parts by mass of acrylic acid, as monomer components, and 0.2 parts by mass of azobisisobutyronitrile, as a polymerization initiator, were added to 200 parts by mass of ethyl acetate, with stirring for 17 hours at 60° C., to yield a solution of an acrylate copolymer having a weight-average molecular weight of 540,000.
A sheet for manufacturing an optical disk was produced in the same way as in Example 1, but using herein the above acrylate copolymer solution.

Comparative Example 5

Herein, 83.5 parts by mass of n-butyl acrylate, 15 parts by mass of methyl acrylate, 1 part by mass of 2-hydroxyethyl acrylate and 0.5 parts by mass of acrylamide, as monomer components, and 0.2 parts by mass of azobisisobutyronitrile, as a polymerization initiator, were added to 200 parts by mass of ethyl acetate, with stirring for 17 hours at 60° C., to yield a solution of an acrylate copolymer having a weight-average molecular weight of 600,000.
A sheet for manufacturing an optical disk was produced in the same way as in Example 1, but using herein the above acrylate copolymer solution.

Comparative Example 6

Herein, 97.5 parts by mass of n-butyl acrylate, 1 part by mass of 2-hydroxyethyl acrylate and 1.5 parts by mass of acrylamide, as monomer components, and 0.2 parts by mass of azobisisobutyronitrile, as a polymerization initiator, were added to 200 parts by mass of ethyl acetate, with stirring for 17 hours at 60° C., to yield a solution of an acrylate copolymer having a weight-average molecular weight of 650,000.
A sheet for manufacturing an optical disk was produced in the same way as in Example 1, but using herein the above acrylate copolymer solution.

Test Example 1

Measurement of Storage Modulus/Peak Temperature of Loss Tangent

The pressure-sensitive adhesive layers of the sheets for manufacturing an optical disk produced in the examples and comparative examples were overlaid as a 100-layer laminate to yield a 2.5 mm-thick pressure-sensitive adhesive layer.

The storage modulus at 25° C. and the peak temperature of the loss tangent of the formed pressure-sensitive adhesive layer was measured at 1 Hz using a viscoelasticity analyzer (DYNAMIC ANALYZER RDA II, by Rheometrics Inc.). The results are given in Table 1.

Test Example 2

Calculation of the Polar Component $\gamma^P s$ of Surface Energy

The contact angles with water and diiodomethane at the surface of the pressure-sensitive adhesive layers of the sheets for manufacturing an optical disk produced in the examples and comparative examples were measured using a contact angle goniometer (DSA100, by KRUSS GmbH). The polar component $\gamma^P s$ of the surface energy was calculated on the basis of the formula below according to the Owens and Wendlt method. The results are given in Table 1.

$\gamma s = \gamma^P s + \gamma^d s$ $36.4(1+\cos \theta^H) = (21.8\gamma^d s)^{1/2} + (51.0\gamma^P s)^{1/2}$ $25.4(1+\cos \theta^I) = (48.5\gamma^d s)^{1/2} + (2.3\gamma^P s)^{1/2}$ $\gamma s$: surface energy (mJ/m$^2$)
$\gamma^P s$: polar component of surface energy (mJ/m$^2$)
$\gamma^d s$: dispersive component of surface energy (mJ/m$^2$)
$\cos \theta^H$: contact angle of water (°)
$\cos \theta^I$: contact angle of diiodomethane (°)

Test Example 3

Measurement of the Gel Fraction

Each pressure-sensitive adhesive solution prepared in the examples and the comparative examples was coated, using a knife coater, onto the release-treated face of a tight release force type release sheet (SP-PET 381031 by Lintec Corp., obtained by treating a polyethylene terephthalate film with a release treatment using a silicone resin release agent), followed by drying at 90° C. for 1 minute, to form a 25 µm-thick pressure-sensitive adhesive layer. Next, an easy release force type release sheet (SP-PET 38GS by Lintec Corp., obtained by treating a polyethylene terephthalate film with a release treatment using a silicone resin release agent), was laminated on each pressure-sensitive adhesive layer, to prepare samples.

Each obtained sample was left to stand for one week at conditions of 23° C. and relative humidity of 50%. Thereafter, the pressure-sensitive adhesive layer was peeled off the release sheet, and the weight of the pressure-sensitive adhesive was measured. The pressure-sensitive adhesive was extracted through refluxing for about 16 hours with ethyl acetate using a Soxhlet extractor. After extraction, the undissolved fraction component was air-dried, was dried at 100° C. for 10 hours, and was then humidity-conditioned by being left to stand for 3 hours under conditions of 23° C. and relative humidity 50%. The weight of the undissolved fraction component at that time was measured, and the gel fraction was measured according to the formula below. The results are given in Table 1.

Gel fraction (%)=(weight of undissolved component after drying and humidity conditioning/weight of the pressure-sensitive adhesive before extraction)×100

Test Example 4

Measurement of Pressure-Sensitive Adhesive Strength

A 100 nm-thick silver layer (silver purity: 99.99%) was formed through sputtering onto a 1.1 mm-thick polycarbonate plate. To prepare a sample, each sheet for manufacturing an optical disk produced in the examples and comparative examples was cut to a width of 25 mm and a length of 100 mm, and then the pressure-sensitive adhesive layer was affixed to the above-described silver layer while the release sheet was removed, using a laminator.

The obtained samples were left to stand for 24 hours at conditions of 23° C. and relative humidity of 50%. To measure the pressure-sensitive adhesive strength, the sheet for manufacturing an optical disk was peeled off the silver layer using a universal tensile tester (Tensilon, by Orientec Co., Ltd.), at a peeling speed of 300 mm/min, and a peeling angle of 180°. The results are given in Table 1.

Test Example 5

Moist Heat Resistance Test

A 100 nm-thick silver alloy layer was formed through sputtering onto a 1.1 mm-thick polycarbonate plate. To prepare a sample, each sheet for manufacturing an optical disk produced in the examples and comparative examples was cut to a width of 25 mm and a length of 100 mm, and the pressure-sensitive adhesive layer-side of the sheet for manufacturing an optical disk was affixed, by press-bonding, to the aforementioned silver alloy layer while the release sheet was removed, using a laminator. The state of the sheet for manufacturing an optical disk at this time was the initial state.

The initial reflectance Ra of the sample towards light of 405 nm wavelength was measured. Specifically, reflectance was measured using a UV-visible spectrophotometer (UV-3100PC, by SHIMADZU Corp.), by irradiating light of 405 nm from the protective sheet-side of the sample.

The sample was next left to stand for 1000 hours in an environment at a temperature of 80° C. and relative humidity 85%. The reflectance Rb towards light of 405 nm wavelength was measured in the same way as above. The reflectance change rate (Y1; %) was worked out on the basis of the formula below. The preferred reflectance change rate in optical disks is no greater than 5%. The results are given in Table 1.

$Y1(\%) = [(Ra-Rb)/Ra] \times 100$

The samples that exhibited no change vis-à-vis the initial state in a visual examination of the state of the sample after 1000-hour exposure in the aforementioned condition were rated as ○. The results are given in Table 1.

Test Example 6

Thermal Cycling Test

The initial reflectance Rc towards light of 405 nm wavelength in a sample produced in the same way as in Test example 5 was measured. The reflectance measurement method was the same as in Test example 5.

The sample was subjected next to 100 cycles of thermal cycling, wherein each cycle involved 3 hours at a temperature of −20° C. and 3 hours at a temperature of 80° C. The reflectance Rd towards light of 405 nm wavelength was measured thereafter in the same way as above. The reflectance change rate (Y2; %) was worked out on the basis of the formula below. The results are given in Table 1.

$$Y2(\%)=[(Rc-Rd)/Rc]\times 100$$

The state of the sample after the above-described 100 cycles was observed visually, and was evaluated under the criteria below. The results are given in Table 1.

○: No change vis-à-vis initial state.

Δ: Delamination between the pressure-sensitive adhesive layer and the silver alloy layer, or between the pressure-sensitive adhesive layer and the protective sheet, in part of the sheet for manufacturing an optical disk.

x: Delamination between the pressure-sensitive adhesive layer and the silver alloy layer, or between the pressure-sensitive adhesive layer and the protective sheet, over the entire surface of the sheet for manufacturing an optical disk.

TABLE 1

| Object | | Ex. 1 | Ex. 2 | Ex. 3 | Ex. 4 | Ex. 5 | Comp. ex. 1 | Comp. ex. 2 | Comp. ex. 3 | Comp. ex. 4 | Comp. ex. 5 | Comp. ex. 6 |
|---|---|---|---|---|---|---|---|---|---|---|---|---|
| Storage modulus (25° C.) (MPa) | | 0.18 | 0.15 | 0.10 | 0.13 | 0.15 | 0.25 | 0.28 | 0.16 | 0.14 | 0.09 | 0.10 |
| Peak temperature of loss tangent (° C.) | | −16.8 | −16.4 | −16.2 | −23.0 | −21.9 | 4.5 | −2.1 | −8.0 | −22.9 | −25.5 | −31.6 |
| Surface energy: (mJ/m²) | Polar component: $\gamma^P s$ | 3.6 | 3.9 | 2.8 | 2.7 | 2.5 | 11.7 | 4.2 | 15.5 | 1.3 | 1.5 | 0.3 |
| | Dispersive component: $\gamma^d s$ | 15.5 | 15.4 | 18.1 | 14.8 | 15.2 | 20.0 | 18.6 | 12.5 | 17.5 | 15.8 | 17.6 |
| | Surface energy: $\gamma s$ | 19.1 | 19.3 | 20.9 | 17.5 | 17.7 | 31.7 | 22.9 | 28.0 | 18.8 | 17.3 | 17.9 |
| Gel fraction: (%) | | 83.7 | 74.9 | 68.1 | 83.4 | 85.3 | 81.8 | 79.3 | 78.7 | 71.1 | 85.3 | 73.8 |
| Adhesive strength: (N/25 mm) | | 9.0 | 15.0 | 17.5 | 14.4 | 16.8 | 16.0 | 14.0 | 13.0 | 6.4 | 5.4 | 7.0 |
| Moist heat resistance test 1000 h, 80° C. 85% RH | Sample state | ○ | ○ | ○ | ○ | ○ | ○ | ○ | ○ | ○ | ○ | ○ |
| | Reflectance change rate | 1.8 | 2.1 | 2.8 | 1.7 | 1.9 | 1.7 | 1.9 | 2.0 | 12.8 | 2.1 | 2.6 |
| Thermal cycling test (−20° C. to 80° C.), 100 cycles | Sample state | ○ | ○ | ○ | ○ | ○ | x | x | Δ | ○ | ○ | ○ |
| | Reflectance change rate | 2.4 | 2.7 | 2.8 | 2.1 | 2.2 | 1.7 | 1.9 | 2.6 | 4.1 | 2.4 | 2.8 |

Table 1 shows that in the sheets for manufacturing an optical disk obtained in the examples the pressure-sensitive adhesive layer exhibited excellent adhesion to a metal layer, and there occurred no delamination from the metal layer or from the protective sheet, even at high temperature and high humidity and in a thermal cycling environment. The rate of change of reflectance was low even at high temperature and high humidity, and corrosion of the metal layer was suppressed.

INDUSTRIAL APPLICABILITY

The present invention is useful in the manufacture of optical recording media having excellent durability also in environments of repeated cooling and heating, or at high temperature and high humidity, and is useful in the form of an optical recording medium. In particular, the present invention is useful in optical disks such as Blu-ray disks or the like.

The invention claimed is:

1. A pressure-sensitive adhesive that forms a pressure-sensitive adhesive layer provided adjacent to a data recording layer of an optical recording medium, wherein a peak temperature of a loss tangent is not higher than −10° C., and a polar component $\gamma^P s$ of a surface energy of the pressure-sensitive adhesive layer is not smaller than 2.0 mJ/m².

2. A sheet for manufacturing an optical recording medium having a data recording layer, comprising: a pressure-sensitive adhesive layer provided adjacent to the data recording layer, wherein the pressure-sensitive adhesive layer has a peak temperature of a loss tangent not higher than −10° C., and has a polar component $\gamma^P s$ of a surface energy not smaller than 2.0 mJ/m².

3. The sheet for manufacturing an optical recording medium according to claim 2, wherein a pressure-sensitive adhesive that forms the pressure-sensitive adhesive layer has a (meth)acrylate copolymer as a main component.

4. The sheet for manufacturing an optical recording medium according to claim 3, wherein the (meth)acrylate copolymer has a nitrogen atom-containing copolymerizable monomer as a monomer component.

5. The sheet for manufacturing an optical recording medium according to claim 3, wherein the (meth)acrylate copolymer has methyl (meth)acrylate as a monomer component.

6. The sheet for manufacturing an optical recording medium according to claim 3, wherein the (meth)acrylate copolymer does not contain an acidic group.

7. The sheet for manufacturing an optical recording medium according to claim 2, wherein a protective layer that forms an optical recording medium is laminated on the pressure-sensitive adhesive layer.

8. The sheet for manufacturing an optical recording medium according to claim 2, wherein a pressure-sensitive adhesive strength is not lower than 8.0 N/25 mm.

9. An optical recording medium, manufactured using the pressure-sensitive adhesive according to claim 1.

10. An optical recording medium that comprises at least a data recording layer and a pressure-sensitive adhesive layer adjacent to the data recording layer, wherein a peak temperature of a loss tangent of the pressure-sensitive adhesive layer is not higher than −10° C., and a polar component $\gamma^P s$ of a surface energy of the pressure-sensitive adhesive layer is not smaller than 2.0 mJ/m².

11. An optical recording medium, manufactured using an optical recording medium according to claim 2.

* * * * *